(12) United States Patent
Comtois et al.

(10) Patent No.: US 10,199,194 B2
(45) Date of Patent: Feb. 5, 2019

(54) ELECTRICAL APPARATUS FOR DISCONNECTING AN ELECTRICAL CURRENT

(71) Applicant: Schneider Electric Industries SAS, Rueil Malmaison (FR)

(72) Inventors: Patrick Comtois, Saint-Ismier (FR); Patrick Larcher, Echirolles (FR)

(73) Assignee: SCHNEIDER ELECTRIC INDUSTRIES SAS, Rueil Malmaison (FR)

(*) Notice: Subject to any disclaimer, the term of this patent is extended or adjusted under 35 U.S.C. 154(b) by 0 days.

(21) Appl. No.: 15/790,330

(22) Filed: Oct. 23, 2017

(65) Prior Publication Data
US 2018/0166243 A1 Jun. 14, 2018

(30) Foreign Application Priority Data
Dec. 8, 2016 (FR) ..................... 16 62136

(51) Int. Cl.
*H01H 71/12* (2006.01)
*H01H 71/02* (2006.01)
(Continued)

(52) U.S. Cl.
CPC ........ *H01H 71/122* (2013.01); *H01H 50/002* (2013.01); *H01H 50/04* (2013.01);
(Continued)

(58) Field of Classification Search
CPC ...... H01H 50/002; H01H 50/04; H01H 50/60; H01H 50/54; H01H 71/122;
(Continued)

(56) References Cited

U.S. PATENT DOCUMENTS 3,319,036 A 5/1967 McGary
3,835,425 A 9/1974 Karch et al.
(Continued)

FOREIGN PATENT DOCUMENTS

DE 2 1 49 365 4/1972
JP 60-59440 U 4/1985
(Continued)

OTHER PUBLICATIONS

French Preliminary Search Report dated Aug. 24, 2017 in French Application 16 62136 filed on Dec. 8, 2016 (with English Translation of Categories of Cited Documents).

*Primary Examiner* — Renee Luebke
*Assistant Examiner* — William Bolton
(74) *Attorney, Agent, or Firm* — Oblon, McClelland, Maier & Neustadt, L.L.P.

(57) ABSTRACT

A disconnecting electrical apparatus includes a disconnecting block, including elements for disconnecting an electric current each able to be actuated with a coupling member, to switch this disconnecting element to a blocking state or a state allowing the electric current to pass, an actuator block, provided with a controllable electromagnet suitable for generating an electromagnetic force, a mobile container provided with a magnetic plate, which displaces the coupling members, under the effect of the electromagnetic force, so as to switch the disconnecting elements. The apparatus also includes a connection interface inserted between the disconnecting block and the actuator block, the mobile container being housed inside the connection interface.

10 Claims, 5 Drawing Sheets

(51) Int. Cl.
*H01H 50/00* (2006.01)
*H01H 50/04* (2006.01)
*H01H 11/00* (2006.01)
*H01H 9/24* (2006.01)
*H01H 9/26* (2006.01)
*H01H 1/58* (2006.01)
*H02B 13/02* (2006.01)

(52) U.S. Cl.
CPC .... *H01H 71/0228* (2013.01); *H01H 71/0235* (2013.01); *H02B 13/02* (2013.01); *H01H 1/5833* (2013.01); *H01H 9/24* (2013.01); *H01H 9/26* (2013.01); *H01H 11/0006* (2013.01); *H01H 11/0012* (2013.01); *H01H 50/045* (2013.01)

(58) Field of Classification Search
CPC ........... H01H 71/0228; H01H 71/0235; H01H 9/182; H01H 9/26; H01H 9/24; H01H 11/0006; H01H 11/0012
USPC ......... 218/154, 153, 155, 7; 200/243, 50.32; 335/130, 156, 202
See application file for complete search history.

(56) References Cited

U.S. PATENT DOCUMENTS

| 4,254,316 A * | 3/1981 | Landow .................. H01H 9/182 200/308 |
| 8,159,321 B2 * | 4/2012 | Bollinger ............. H01H 50/045 335/132 |
| 8,378,245 B2 * | 2/2013 | Fischer .................. H01H 71/56 200/400 |
| 2002/0050877 A1 * | 5/2002 | Swartzentruber .... H01H 50/002 335/8 |
| 2010/0258413 A1 * | 10/2010 | Leischner ............. H01H 19/64 200/11 R |
| 2013/0140153 A1 * | 6/2013 | Larcher .................... H01H 9/26 200/50.32 |
| 2015/0325397 A1 | 11/2015 | Larcher et al. |

FOREIGN PATENT DOCUMENTS

JP 62-71846 U 5/1987
WO WO 2014/096579 A1 6/2014

* cited by examiner

ELECTRICAL APPARATUS FOR DISCONNECTING AN ELECTRICAL CURRENT

The invention relates to an electrical apparatus for disconnecting an electric current.

In the field of electrical apparatuses for disconnecting a low-voltage and high-amperage electric current, such an apparatus comprising a disconnecting block and an actuation block is known from WO-2014/096579-A1. The disconnecting block includes multiple disconnecting elements, also referred to as breaking cartridges, each intended to be electrically connected to an electrical circuit via connection terminals. Each disconnecting element is suitable for switching between an on state, in which it allows the current to flow between the terminals, and a blocking or off state in which it prevents the flow of this electric current. This switching operation is carried out by means of a coupling member arranged on a front face of each disconnecting element and taking the form, for example, of a screw head.

The actuation block includes a controllable electromagnet and a mobile container, provided with a ferromagnetic plate, which is translatably displaced under the effect of the electromagnet. The container is translatably rigidly connected to the coupling members of the disconnecting elements, thus causing them to switch when it is displaced under the action of the electromagnet.

One drawback of these known electrical apparatuses is that the actuator block has to be tailored to each type of disconnecting block. In particular, the dimensions of the disconnecting block may vary according to the type of electric current, for example according to the amperage level or according to the number of electrical phases. This complicates the industrial manufacture of the electrical apparatus, since it makes it necessary to provide as many different arrangements of the actuator block as there are variants of the disconnecting block.

It is these drawbacks which the invention more particularly intends to overcome by proposing an electrical disconnecting apparatus that is simpler to manufacture industrially.

To this end, the invention relates to an electrical apparatus for disconnecting an electric current, including:
- a disconnecting block, including elements for disconnecting an electric current, each able to be actuated by means of a coupling member, to switch this disconnecting element to a blocking state or a state allowing the electric current to pass;
- an actuator block, provided with a controllable electromagnet suitable for generating an electromagnetic force in response to a control signal;
- a mobile container provided with a magnetic plate, this mobile container being suitable for exerting, under the effect of the electromagnetic force, a mechanical force that displaces the coupling members so as to switch the disconnecting elements.

The apparatus also comprises a connection interface, distinct from the disconnecting block and the actuator block, this connection interface being inserted between the disconnecting block and the actuator block, the mobile container being housed inside the connection interface.

By virtue of the invention, by housing the mobile container in a dedicated connection interface, it avoids the need to use a specific actuation block for each possible variant of the disconnecting block. Indeed, it is the connection interface which is shaped and sized specifically to be tailored to the disconnecting block with which it is associated.

Thus, the face of the connection interface that is intended to be connected to the actuation block is the same, regardless of the configuration of the disconnecting block. It is thus possible to use one and the same actuator block regardless of the shape of the disconnecting block.

This makes it possible to rationalize the industrial process for manufacturing the apparatus. In particular, an expensive part such as the actuation block does not need to be provided in multiple variants. Moreover, the manufacture and/or the installation of the electrical apparatus is thereby simplified, since using one and the same actuator block for different variants of the disconnecting block decreases the logistical constraints linked to the management of various individual parts, in comparison with the case in which it would be necessary to manage multiple variants of the actuator block.

According to advantageous but non-mandatory aspects of the invention, such an electrical apparatus may incorporate one or more of the following features, either alone or in any technically permissible combination:
- the connection interface includes a main body provided with a guiding device for translatably guiding the container with respect to the main body;
- the guiding device includes a lever that mechanically connects the mobile container to the main body;
- the connection interface is fastened to the disconnecting block by means of a fastening system of mortise-and-tenon type, either the disconnecting block or the connection interface including a tenon, the other including a groove that is complementary in shape to the tenon;
- the width of the mobile container is greater than the distance between the coupling members that are located on opposite sides of the front face of the disconnecting block;
- the mobile container is provided with a zone for receiving the coupling members for the purpose of anchoring the mobile container so that it is translatably rigidly connected to the respective mobile portions of the disconnecting elements bearing the coupling members, the mobile container being sized so as to exert a force simultaneously on all of the coupling members when it is displaced under the effect of the electromagnetic force;
- the coupling members include screws, a head of which protrudes with respect to the disconnecting element, the mobile container being provided with forks that are each intended to grip a corresponding screw head for the purpose of anchoring the mobile container to the mobile portions;
- the switching of each of the disconnecting elements is achieved by displacing the coupling member in a direction parallel to the direction of translation of the mobile container;
- the disconnecting block includes three disconnecting elements;
- the disconnecting block includes four disconnecting elements.

The invention will be better understood and other advantages thereof will become more clearly apparent in the light of the following description of one embodiment of an electrical disconnecting apparatus provided solely by way of example and with reference to the appended drawings, in which:

FIGS. 1 to 5 show an electrical disconnecting apparatus 1 according to a first embodiment of the invention.

Figure 1:
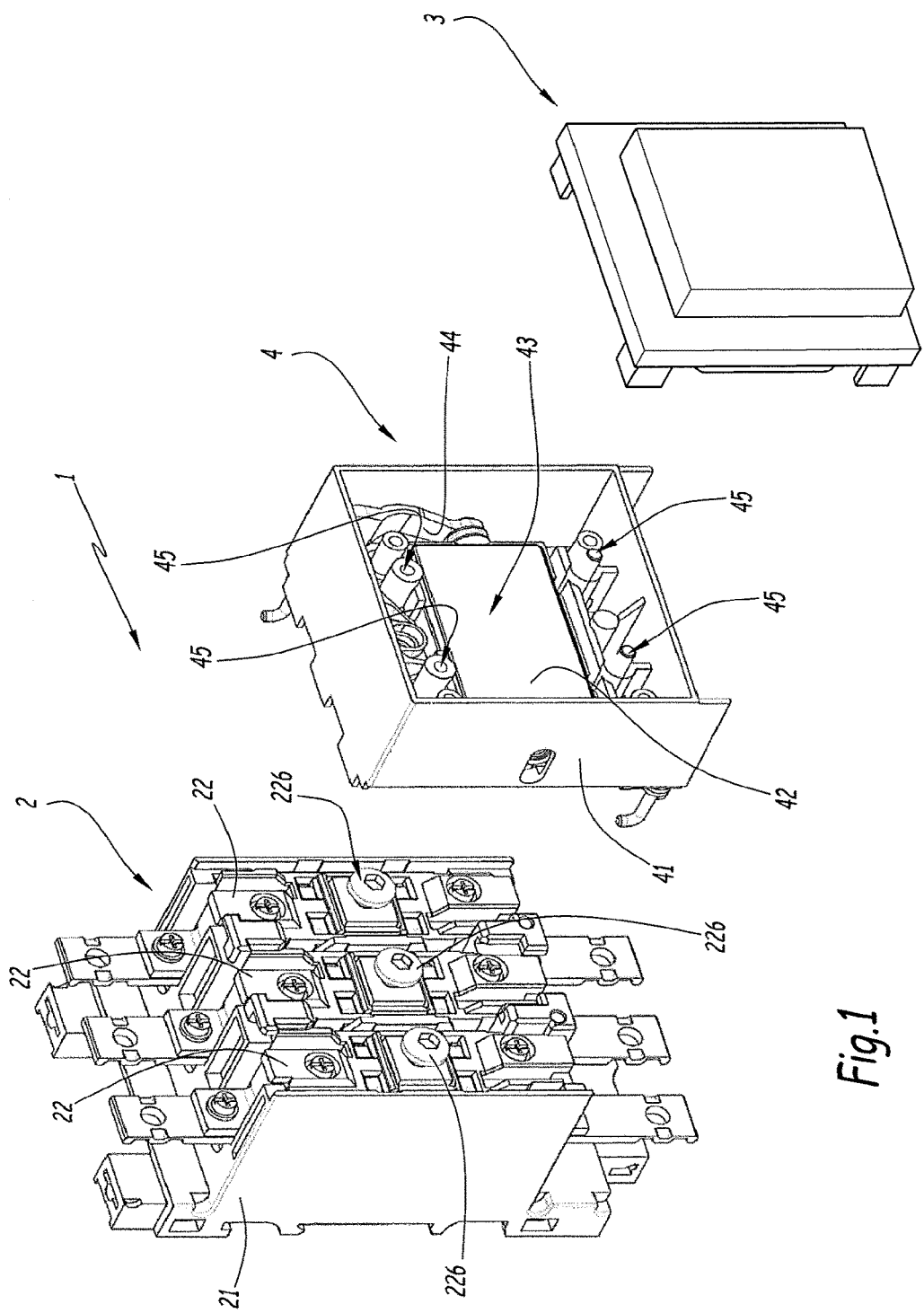
FIG. 1 is a schematic representation, in exploded view, of an electrical disconnecting apparatus according to a first embodiment of the invention.

The apparatus 1 includes a disconnecting block 2, an actuator block 3, also referred to as an actuation block, and a connection interface 4 between the actuator block 3 and the disconnecting block 2.

The function of the electrical apparatus 1 is to interrupt or, alternately, to allow the flow of an electric current in a controllable manner, for example in response to a control signal transmitted by a control unit, not illustrated.

For example, the apparatus 1 is intended to control the switching of AC electric currents in accordance with the operating current categories of AC1, AC3 or AC4 type as defined by International Electrotechnical Commission standard IEC60947-3.

The disconnecting block 2 includes a fixed base 21 and disconnecting elements 22. The base 21 is for example fastened, by its rear face, to an electrical switchboard.

For example, the electrical apparatus 1 is intended to be used with a three-phase electric current. Each disconnecting element 22 is then associated with one electrical phase component of this three-phase current. The disconnecting elements 22 number three in this instance and are identical to one another.

The base 21 includes compartments 23, each suitable for accommodating one of the disconnecting elements 22. The disconnecting elements 22 are removable and may be taken out of the corresponding compartments 23, for example when carrying out maintenance operations.

Each disconnecting element 22 includes fixed electrical conductors 221 and 222, which conductors are electrically isolated from one another and electrically connected to corresponding connection lands 24, 25, respectively, which lands are borne by the disconnecting block 2.

Each disconnecting element 22 is selectively and reversibly switchable between an on state and a blocking or off state. In the on state, the element 22 allows an electric current to pass between the connection lands 24 and 25, via the fixed conductors 221 and 222. In the off state, the disconnecting element 22 prevents the flow of this electric current.

In this example, each disconnecting element 22 includes a fixed portion, to which the fixed conductors 221 and 222 are rigidly connected, and also includes a mobile electrical conductor 223, rigidly connected to a mobile portion 224, which can be displaced with respect to the fixed portion. This displacement is in this instance carried out in a direction of displacement that is perpendicular to a front face of the disconnecting block 2.

For example, the switching elements 22, and in particular the fixed and mobile portions, are made of an electrically insulating material, for example plastic, for example crosslinked polyamide of PA66 type. The fixed conductors 221 and 222, as well as the mobile conductor 223, are made of an electrically conductive material, such as a metal bar.

The mobile portion 224 can be displaced by means of a coupling member 226, which includes in this instance a screw, a head of which protrudes with respect to a front face of this disconnecting element 22. When the elements 22 are accommodated in the compartments 23, the members 226 are aligned with one another along the front face.

Thus, in the on state, the mobile conductor 223 places the fixed conductors 221 and 222 in electrical contact, thus allowing the electric current to pass, while in the off state, the mobile conductor 223 is at a distance from the fixed conductors 221 and 222, thereby preventing the current from passing between the latter.

In this example, the disconnecting element 22 is by default in its off state. In order to switch the element 22 to the on state, a mechanical tractive force is exerted on the screw heads of the coupling members 226 by pulling on them in the direction of displacement towards the front of the apparatus 1. When no force is exerted on the coupling members 226, a return member 225 of the disconnecting element 22 brings the mobile conductor 223 back to its initial position, hence switching the disconnecting element 22 to its off state.

The connection interface 4 is intended to be fixedly rigidly connected to the front face of the disconnecting block 2. The interface 4 includes a main body 41, which body is rigidly connected to the disconnecting block 2, and a mobile container 42, which can be translatably displaced with respect to the body 41 in a direction of displacement. The interface 4 is a separate part with respect to the actuator block 3 and the disconnecting block 2.

The width of the main body 41 is in this instance equal to the width of the disconnecting block 2.

When the interface 4 is rigidly connected to the disconnecting block 2, the direction of displacement of the container 42 is parallel to the respective directions of displacement of the mobile portions 224 of the various disconnecting elements 22.

The container 42 is essentially planar in shape and delimits a compartment that accommodates a plate 43, which plate is rigidly fastened to the container 42 and which is turned towards a front face of the container 42. In an assembled configuration of the apparatus 1, the plate 43 is aligned with the actuator block 3, as explained in greater detail below.

In this instance, the width of the container 42 is greater than the distance between the coupling members 226 located on opposite sides of the front face of the disconnecting block 2. In this instance, the members 226 are aligned in rows along a horizontal axis along the front face of the disconnecting block 2. The distance is therefore measured along this horizontal axis, between the members 226 located at opposite ends of the row.

The plate 43 is made of a magnetic material, for example a ferromagnetic metal.

Figure 2:
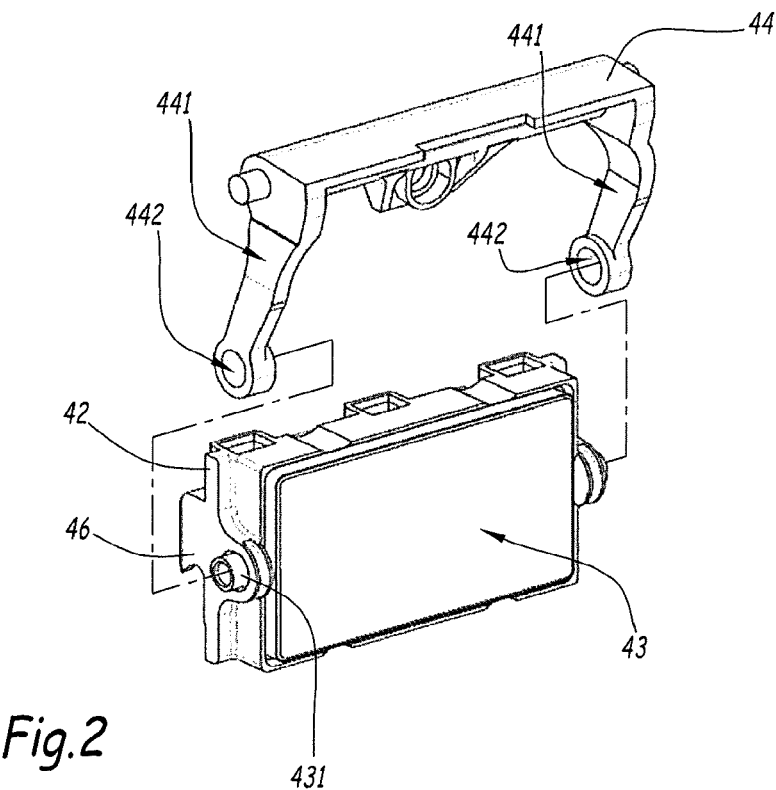
FIG. 2 is a schematic representation, in exploded view, of a mobile container of the electrical apparatus of FIG. 1.
Figure 3:
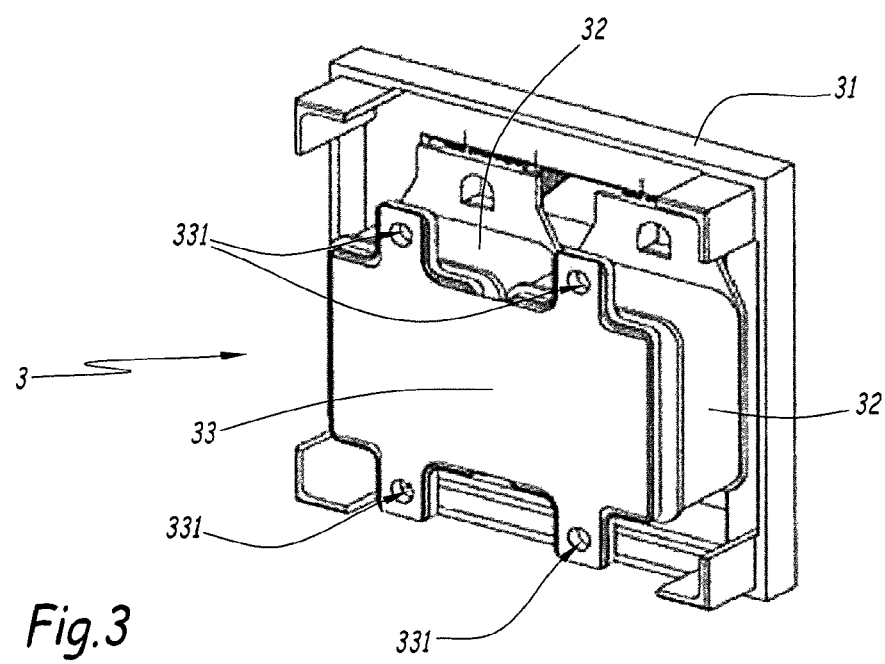
FIG. 3 is a schematic representation, in perspective view, of an actuation block of the electrical apparatus of FIG. 1.

The main body 41 is provided with a device for translatably guiding the mobile container 42. In this example, as can be seen in FIG. 2, this device includes a lever 44 that mechanically connects the mobile container 42 to the main body 41. The lever 44 additionally allows the mechanical force exerted on the various coupling members 226 to be spread, so that the elements 22 are switched simultaneously.

For example, the lever 44 includes two symmetrical lever arms 441 that are each provided, on a distal end, with an aperture 422 for forming an articulated link. The container 42 includes outer protuberances 431 which protrude with respect to lateral edges of this container. These protuberances 431 are in this instance engaged in the apertures 442 for forming the articulations.

The lever 44 itself is rigidly connected to the fixed body 41 by means of pivot links, in this instance positioned on either side of a main branch of the lever 44 linking the two arms 441 to one another and extending along a longitudinal axis. Thus, the lever 44 is pivotably mounted with respect to the body 41 along this longitudinal axis.

Advantageously, the lever 44 is provided with springs that allow it to return to its initial position when no force is exerted on the container 42, for example torsion springs arranged at the level of the articulations with the protuberances 431 of the container 42.

The rear face of the container 42 is provided with a zone for accommodating the members 226 which allows the container 42 to be translatably rigidly connected to the members 226. The rear face of the container 42 is in this instance the face of the container 42 that is turned towards the coupling members 226 when the interface 4 is rigidly connected to the disconnecting block 2.

Thus, the role of the coupling members 226 is to rigidly connect the mobile portions 224 to the mobile container 42.

Figure 4:
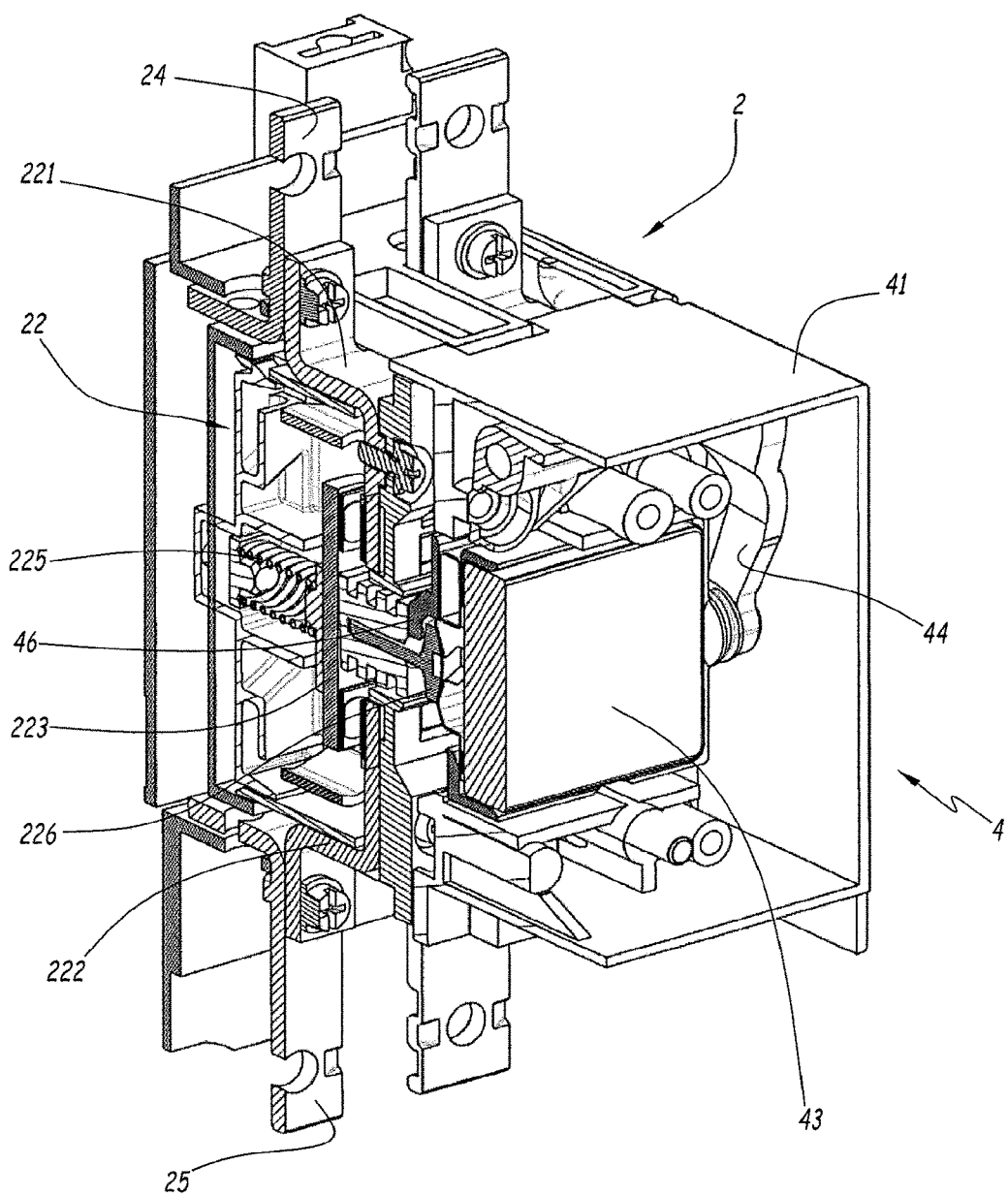
FIG. 4 is a schematic representation, in cutaway view, of a connection interface fastened to a disconnecting block of the electrical apparatus of FIG. 1.

In this example, as can be seen in FIG. 4, the accommodation zone is shaped so as to conform to the shape of the screw heads 226 and in particular takes a hollow shape.

The accommodation zone also includes forks 46, each suitable for gripping one of the coupling members 226, in this instance the screw heads, for example by bearing on the back of the screw heads. The forks are advantageously provided with a catch that allows each fork 46 to be clamped around the corresponding screw head.

Thus, in the assembled configuration, the mobile portion 224 is translatably rigidly connected to the container 42 along the direction of displacement.

The actuator block 3 is suitable for being rigidly fastened to a front face of the interface 4.

The actuator block 3 is configured to exert an electromagnetic force in the direction of displacement in response to a control signal. The electromagnetic force causes a displacement of the metal plate 43 and hence of the container 42 in the direction of displacement.

Preferably, the metal plate 43 is made of a ferromagnetic material.

To this end, the actuator block 3 includes one or more electromagnets 32, which are in this instance formed by winding a conductive wire around a magnetic core, not illustrated. For example, the electromagnets 32 are each cylindrical or rectangular in shape, having an axis that is parallel to the direction of displacement when the actuator block 3 is fastened to the interface 4.

These electromagnets 32 are supplied with electrical power and generate an electromagnetic force in response to the control signal. This electromagnetic force displaces the magnetic plate 43 and hence displaces the container 42.

The actuator block 3 also includes at least one bottom plate 33 that is linked to one or more cores, which plate covers a rear face of the electromagnets 32, and a fixed housing 31.

The actuator block 3 is fastened to the interface 4 in this instance at the level of the bottom plate 33. To this end, the bottom plate 33 includes through-apertures 331, which in this instance are formed in pads that extend as protrusions that are coplanar with the bottom plate 33. In a mounted configuration of the block 3 on the interface 4, the apertures 331 are aligned with corresponding fastening apertures 45 made in the main body 41. Thus, the block 3 is fastened to the interface 4 by means of fastening elements such as nuts and bolts inserted into the apertures 331 and 45.

Figure 5:
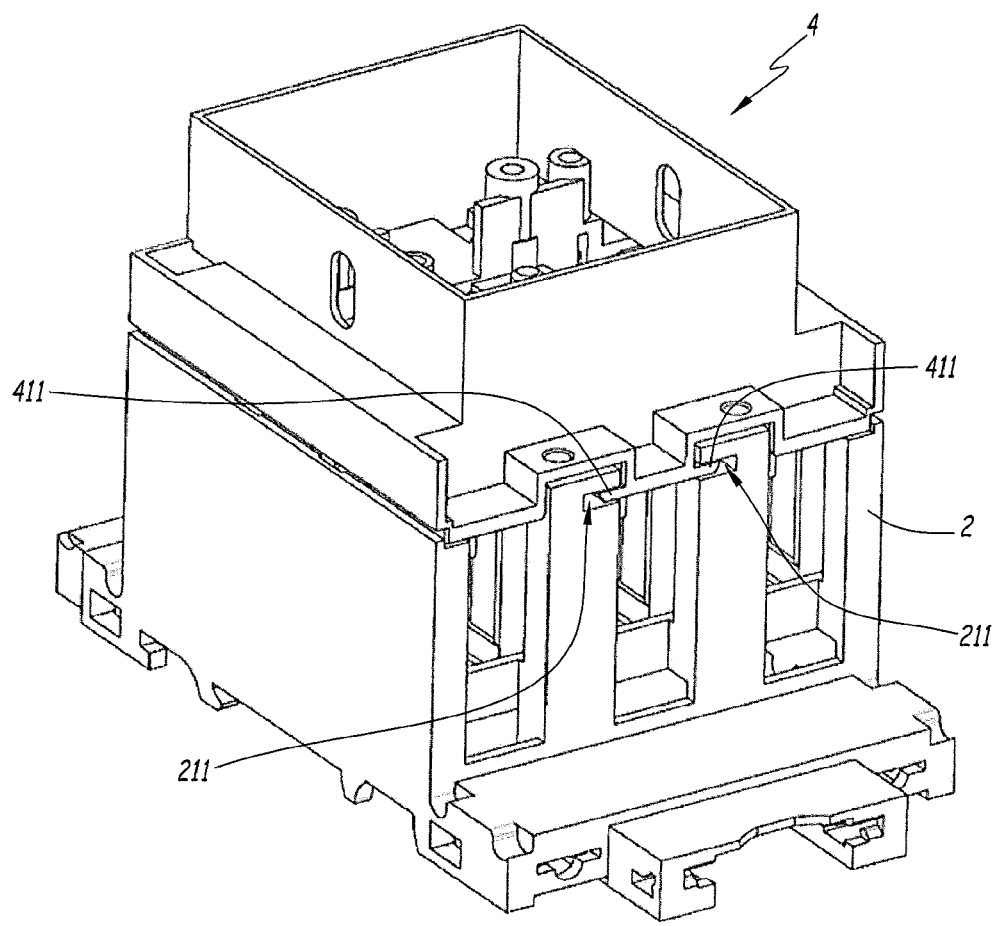
FIG. 5 is a schematic representation, in perspective view, of the connection interface and of the disconnecting block of FIG. 4.

Advantageously, as illustrated in FIG. 5, the interface 4 is fastened to the disconnecting block 2 by means of a mortise-and-tenon system. In this example, the front face of the disconnecting block 2 is provided with grooves or slots 211 that extend in a vertical direction. The rear face of the connection interface 4 includes tenons 411, the shape of which is complementary to that of the grooves 211, and which are arranged in a vertical direction.

The interface 4 is thus fastened to the disconnecting block 2 in a simplified manner using a bayonet motion, first by placing the interface 4 against the front face of the disconnecting block 2, then by sliding the interface 4 with respect to the disconnecting block 2 in the vertical direction, preferably downwards. Advantageously, end stops, not illustrated, allow the interface 4 to be blocked upon completion of this movement.

This vertical translational movement allows both the interface 4 to be attached to the disconnecting block 2 and the container 42 to be mechanically linked to the coupling member 226, by virtue of the fork 46.

Thus, in the assembled configuration of the apparatus 1, the connection interface 4 connects the actuator block 3 to the disconnecting block 2 by being inserted between these blocks 2 and 3.

By accommodating the mobile container 42 inside the connection interface 4 rather than inside the actuator block 3, it avoids having to use a dedicated actuator block 3 for each variant embodiment of the disconnecting block 2. It is the connection interfaces 4 which are tailored and optimized according to the dimensions and characteristics of the disconnecting block 2 to which they are intended to be fastened, such as the width of the disconnecting block 2 or the centre-to-centre distance between the respective members 226 of the various elements 22.

Since the connection interface 4 is less expensive and less complex to produce than the actuator block 3, the industrial manufacture of the apparatus 1 is thereby improved.

Figure 6:
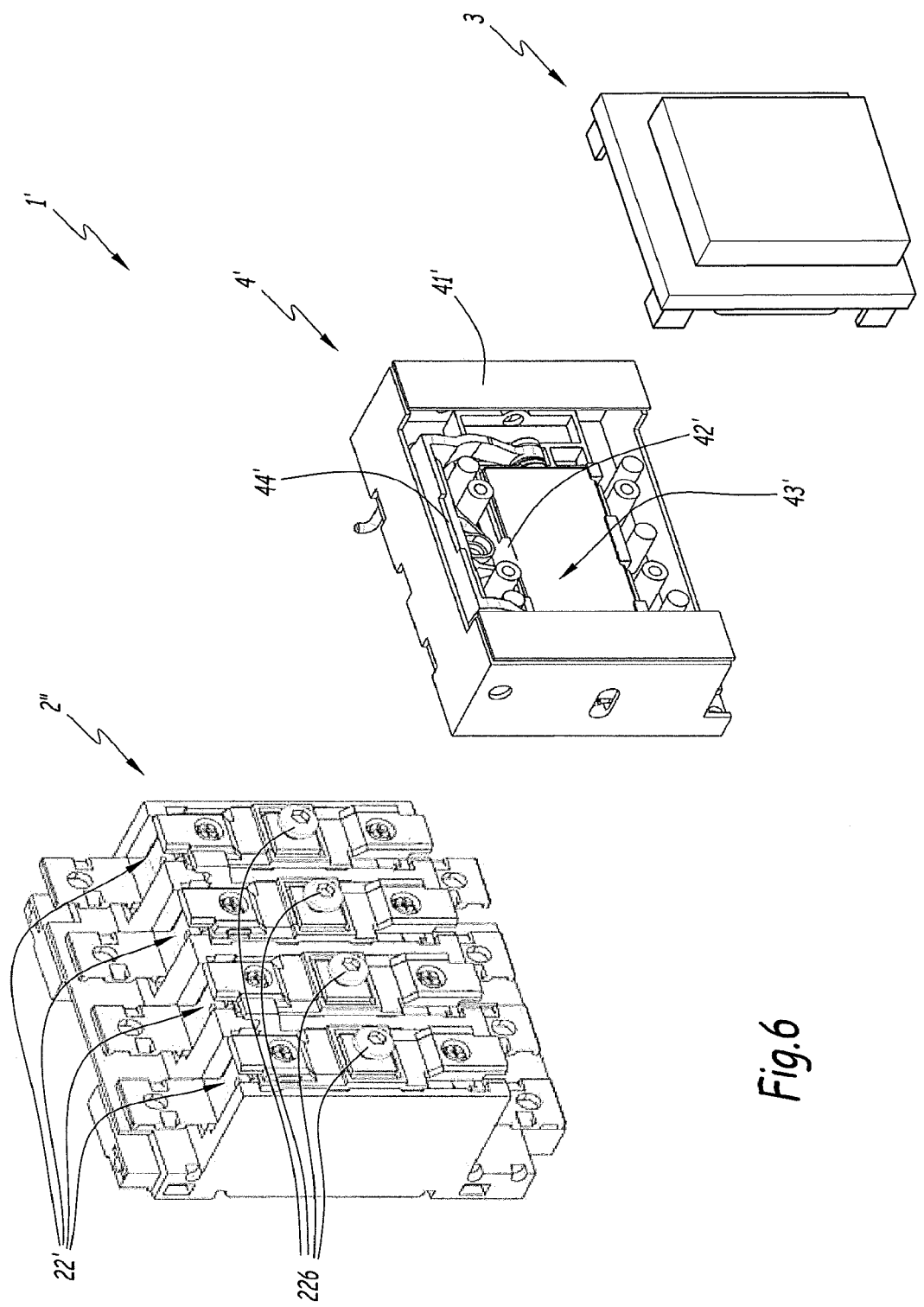
FIG. 6 is a schematic representation, in exploded view, of an electrical disconnecting apparatus according to a second embodiment of the invention.

FIG. 6 shows a disconnecting apparatus 1' according to a second embodiment of the invention.

Those elements of the electrical apparatus 1' according to this embodiment which are analogous to those of the first embodiment of FIGS. 1 to 5 bear the same references and are not described in detail, given that the description above may be applied to them.

Those elements of the electrical apparatus 1' according to this embodiment which differ from those of the first embodiment of FIGS. 1 to 5 but which play a similar role bear the same references with the addition of the symbol "'" and only their differences are described in detail, given that the description above may also be applied to them.

The electrical apparatus 1' includes a disconnecting block 2', an actuator block 3 and a connection interface 4'.

For example, the apparatus 1' is in this instance of four-pole type and is intended to control the disconnection of AC electric currents in accordance with AC1 class such as defined by International Electrotechnical Commission standard IEC60947-3.

The disconnecting block 2' is analogous to the disconnecting block and differs therefrom in particular in that it includes four removable disconnecting elements 22', which elements are analogous to the elements 22 and which play the same role. However, the internal composition of the disconnecting elements 22' is tailored to the category of the operating current with a specific internal architecture and disconnecting systems. Each of them includes in particular a coupling member 226. In fact, the width of the disconnecting block 2' is greater than that of the disconnecting block 2. The width of the interface 4' is consequently increased with respect to the width of the interface 4, as described below.

For example, the disconnecting block 2' is suitable for use with a polyphase electrical circuit, comprising three electrical phases and a neutral phase.

The interface 4' is arranged so as to be inserted between the actuator block 3 and the disconnecting block 2'.

The interface 4' includes a main body 41' and a mobile container 42' that bears a magnetic plate 43'. The container 42' can be translatably displaced analogously to the container 42 and differs from the latter only in its width and that of the metal plate 43'. In particular, the container 42' is arranged so as to be translatably rigidly connected to each of the members 226 of the four disconnecting elements 22'. Thus, the width of the container 42' is greater than that of the container 42. Similarly, the dimensions of the main body 41' are modified so as to correspond to the width of the fixed base of the block 2'. The width of the lever 44' is consequently also increased.

Thus, by virtue of the interface 4', the same actuator block 3 may be used regardless of the shape of the disconnecting block 2 or 2'. This makes it possible to rationalize the process of industrially manufacturing the disconnecting apparatus 1 or 1'.

Other variants are possible, depending on the number of disconnecting elements 22 or 22', as well as their arrangement on the front face of the disconnecting block 2 or 2' or the value of the centre-to-centre distance between the members 226.

The embodiments and the variants envisaged above may be combined with one another so as to create new embodiments of the invention.

The invention claimed is:

1. An electrical apparatus for disconnecting an electric current, comprising:
    a disconnecting block, including elements for disconnecting the electric current, each able to be actuated by a coupling member, to switch said disconnecting element to a blocking state or a state allowing the electric current to pass;
    an actuator block, provided with a controllable electromagnet suitable for generating an electromagnetic force in response to a control signal;
    a mobile container provided with a magnetic plate, said mobile container being suitable for exerting, under an effect of the electromagnetic force, a mechanical force that displaces a coupling member to switch the disconnecting elements; and
    a connection interface, distinct from the disconnecting block and the actuator block, said connection interface being inserted between the disconnecting block and the actuator block, the mobile container being housed inside the connection interface.

2. The apparatus according to claim 1, wherein the connection interface includes a main body provided with a guiding device for translatably guiding the container with respect to the main body.

3. The apparatus according to claim 2, wherein the guiding device includes a lever that mechanically connects the mobile container to the main body.

4. The apparatus according to claim 1, wherein the connection interface is fastened to the disconnecting block by a mortise-and-tenon fastening system, either the disconnecting block or the connection interface including a tenon, with other of the disconnecting block or the connection interface including a groove that is complementary in shape to the tenon.

5. The apparatus according to claim 1, wherein a width of the mobile container is greater than a distance between coupling members that are located on opposite sides of a front face of the disconnecting block.

6. The apparatus according to claim 1, wherein the mobile container is provided with a zone for receiving coupling members for a purpose of anchoring the mobile container so that it is translatably rigidly connected to respective mobile portions of the disconnecting elements bearing the coupling members, the mobile container being sized so as to exert a force simultaneously on all of the coupling members when it is displaced under effect of the electromagnetic force.

7. The apparatus according to claim 6, wherein the coupling members include screws, a head of which protrudes with respect to the disconnecting element, the mobile container being provided with forks that are each intended to grip a corresponding screw head for the purpose of anchoring the mobile container to the mobile portions.

8. The apparatus according to claim 1, wherein the switching of each of the disconnecting elements is achieved by displacing the coupling member in a direction parallel to a direction of translation of the mobile container.

9. The apparatus according to claim 1, wherein the disconnecting block includes three disconnecting elements.

10. The apparatus according to claim 1, wherein the disconnecting block includes four disconnecting elements.

* * * * *